Aug. 9, 1960  R. S. DEAN ET AL  2,948,663
COMPOSITION OF MATTER INCLUDING TITANIUM CRYSTAL
INTERGROWTHS AND METHOD OF MAKING SAME
Filed Jan. 15, 1957
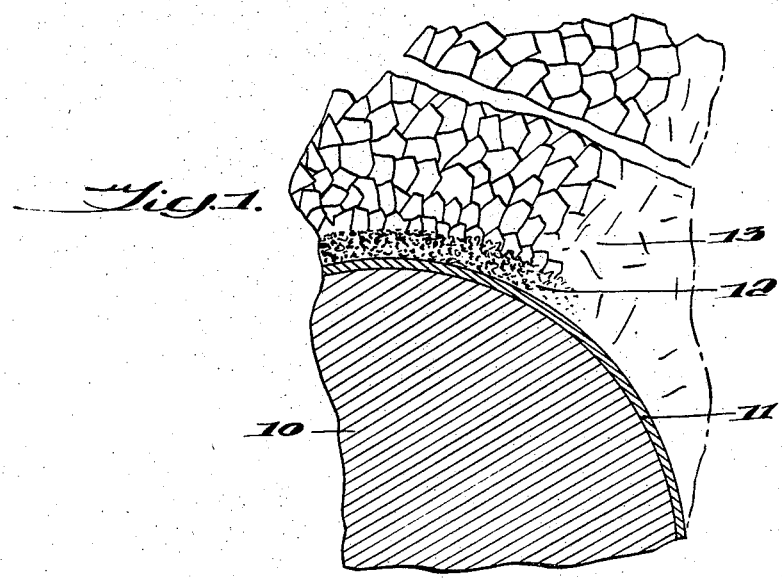
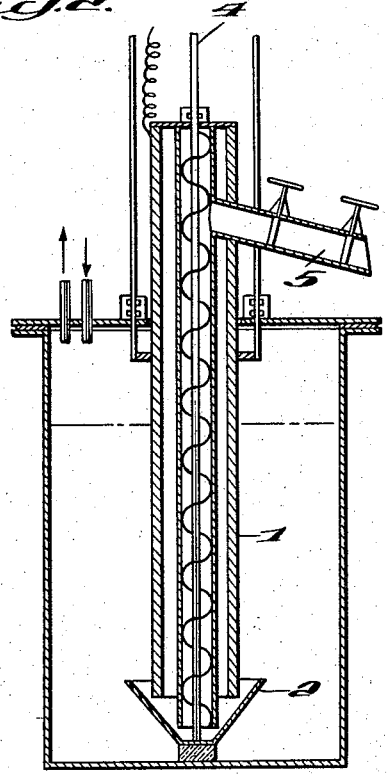
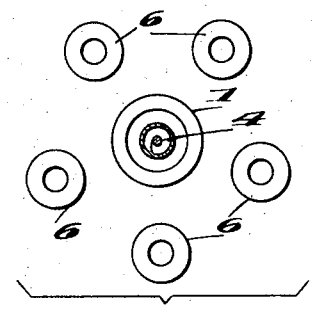
INVENTORS
REGINALD S. DEAN,
WILLIAM W. GULLETT,
BY Pierce, Scheffler & Parker
their ATTORNEYS

United States Patent Office 2,948,663
Patented Aug. 9, 1960

2,948,663

COMPOSITION OF MATTER INCLUDING TITANIUM CRYSTAL INTERGROWTHS AND METHOD OF MAKING SAME

Reginald S. Dean, Hyattsville, and William W. Gullett, College Park, Md., assignors to Chicago Development Corporation, Riverdale, Md., a corporation of Delaware Filed Jan. 15, 1957, Ser. No. 634,364

2 Claims. (Cl. 204—64)

This invention relates to a composition of matter having three layers (1) highly pure titanium in the form of crystal intergrowths frangibly attached to a (2) titanium plate by (3) a layer of solid salt with dispersed titanium crystals, the intergrowths being easily removed from the other layers of the composition by mechanical means without breaking the intergrowths into individual crystals and without contamination from the metal surface on which the composition is formed. It relates more particularly to compositions in which the intergrowths of titanium crystals are formed in a molten salt bath and have open branched limbs to permit substantially complete drainage of the molten salt therefrom. It relates also to methods of producing the composition so as to have most of it in the form of intergrowths of titanium crystals in open branching limbs as described.

In co-pending application of Gullett, Serial Number 592,543, filed June 20, 1956, now Patent No. 2,874,454, a novel composition consisting of a titanium plate, a layer of salt with dispersed titanium crystals and an outer layer of coarse titanium crystals has been disclosed, and in co-pending application of Dean, Serial Number 600,039, filed July 25, 1956, the formation of coarse highly pure titanium crystal aggregates from super-saturated solutions has been disclosed.

We have now found that by the control of certain parameters, the processes of these applications can be made to produce an improved and highly useful composition having as the outer layer of said composition pure titanium intergrowths in an arrangement which greatly facilitates removal of the molten salts in which the composition is formed and simplifies the mechanical removal of the intergrowths from the surface to which they are attached.

It should be pointed out while the salt in the layer with fine titanium crystals is molten during formation of the composition of this invention it remains in place due to its viscosity and solidifies on cooling to form a rigid three layer entity which is the composition claimed.

The parameters which must be controlled are temperature, salt bath composition, surface area and composition of impure titanium which is used and anode geometry of the cell and current passed through it.

The improved steps in the process to obtain the product of the present invention will be clear from the examples which we will give to illustrate the invention.

In the accompanying drawing:

Fig. 1 is a portion of an enlarged transverse section through a composition according to the present invention, illustrating an iron rod (cathode) carrying thereon a thin plate of titanium, an intermediate salt layer containing dispersed titanium crystals, and an outer layer of the intergrowths of the invention frangibly held by the salt layer;

Fig. 2 is a diagrammatic representation of an electrolytic cell, minus anodes, operable for use in carrying out the process described herein; and Fig. 3 is a top plan view of the cell illustrated in Fig. 2, showing an operable anode-cathode relationship.

As above stated, Figure 1 illustrates the three layers of the composition of our invention on the iron rod on which the composition has been formed. In Fig. 1 an iron rod is indicated at 10. On the cathode are disposed, in succession, a thin plate layer 11, a layer 12 of salt crystals interspersed with fine crystals of titanium and an outer layer 13 of coarse pure crystal intergrowths of titanium.

The plate layer 11 of our composition is from about 0.1–25 mils in thickness. The thickness depends on the initial current density on the cathode. At lower current densities, the plate layer is thicker while the salt layer 12 is thinner. The salt layer 12 may be from 1–50 mils thick, but for the purpose of the present invention, we prefer to have the initial current density on the cathode low, e.g. 20–30 amperes per square foot for a period of about 30 minutes to one hour in order to have a thickness of the salt layer of 10 mils or less.

The crystals in the salt layer are of highly pure titanium and from 1 micron to 100 microns in average diameter. The relative proportion by weight of titanium crystals to salt is from 1:1 to 8:1.

The thickness of the intergrowth layer 13 of our composition is not critical. It may be any thickness depending on the geometry of the cell and the distance from and nature of the anode. This layer is usually from 1 to about 4 inches in thickness.

The bonding of the inner or plate layer 11 of our composition to the cathode 10 is not permanent and depends on the nature and surface of the cathode, and temperature of operation. In certain instances, as illustrated in Example 1, we prefer to use a titanium cathode so as to avoid any possibility of contamination from the cathode. The composition of our invention is easily removed from such a cathode.

When an iron cathode is used, there may be some contamination of the plate layer of our composition, but not the other layers. We find that when an iron or steel cathode which has been previously plated is used, then our composition may be readily stripped from the underplate without contamination.

It should be understood that by intergrowths, we mean to describe crystal aggregates in which the individual crystals are firmly attached to each other by a metallic bond as distinct from bundles which are held together by interlacing of the crystals.

An examination of the intergrowths layer of the composition of the present invention, e.g., a product made in accordance with Example IV following, shows, variously, crystal intergrowths of tabular habit in planar arrangement, that is, made up of short prismatic forms, arranged with some relation to a plane; also, intergrowths of crystals, some of which have tabular habit in planar arrangement and some of which have block-like habit in polar arrangement, that is, disposed so as to place their mathematical axis in a particular direction; and intergrowths of crystals of block-like habit and polar arrangement, which may also be described as a parallel intergrowth.

In general, we find that the block-like intergrowths in polar arrangement are formed at high temperature and are pseudomorphs of hexagonal alpha titanium after cubic beta titanium. There is some evidence that these pseudomorphs may be formed below the transition temperature of alpha to beta titanium, namely, 880° C. Regardless of the temperature of formation they may be identified by the angles of their crystal faces, which clearly show them to be of cubic external form. The internal structure of these pseudomorphs is one of fine crystals formed by transition from beta to alpha.

The tabular intergrowths are essentially of hexagonal crystal structure which also corresponds to the arrangement of the atoms in the crystals.

The descriptions of the composition of the invention which we have given are for the material after cooling to room temperature. At a temperature above 880° C. the block-like cubic intergrowths will have the atomic arrangement of beta titanium as well as the cubic external structure. The arrangement on the titanium plate 11 of our composition will not be altered, and the salt layer 12 with dispersed titanium crystals which holds the intergrowths to the plate is always present so that the composition of this invention consists of three layers as described above.

The habit of the crystal intergrowths is primarily a function of temperature of formation as has been pointed out. However, the formation of the article of this invention depends on the diffusion of titanium from the anode being substantially equal to that formed at the cathode so that a proper relationship of the current to the anode surface and distance from the cathode must be maintained. If the current is too high or its distribution uneven, then crystals of filamentary habit will form due to depletion of the electrolyte in titanium.

The formation of some crystals of filamentary habit is within the scope of our invention and the composition of our invention may contain them.

A cathode deposit having a major proportion of such crystals is not, however, within the scope of our invention since the electrolyte is progressively depleted in titanium thereby, and the composition less desirable from several standpoints.

When anode-cathode surface ratio and current are such as to deplete the bath, then the deposit is in the form of bundles of crystals of filamentous habit. Such crystal aggregates are less desirable than the intergrowths characteristic of the outer layer of the composition of the present invention because they retain more salt, e.g. 20% by weight as compared to a maximum of around 10% for the compositions of this invention, furthermore the electrolyte is depleted, e.g. for a deposit of the filamentous type the titanium content of the bath dropped from 5.0% to 3.5% and the layer of salt and fine crystals on the cathode surface is thicker resulting in loss of electrolyte from the bath.

It is therefore the essence of our invention to produce a composition consisting essentially of a titanium plate, a layer of salt with dispersed titanium crystals and an outer layer of crystal intergrowths of tabular or block-like habit with only a few filamentous particles.

The electrolyte for our invention may be any alkalinous chloride or mixture of such chlorides including, sodium, potassium, lithium, calcium, magnesium, barium, strontium and their mixtures. The selection will depend on the use to which our composition is to be put. If it is to be free from salt by washing with very dilute acid then sodium chloride is the preferred salt as it hydrolyses less. If the salt is to be volatilized from the deposit then potassium chloride is to be preferred.

*Example I*

In this example, we take a stainless steel vessel eight inches in diameter and three feet long, into which we suspend an anode basket of inert metal consisting of two concentric cylinders 12" high of perforated cold rolled steel which are 7½" in diameter respectively and are joined by a bottom between them, thereby forming a basket into which we place four pounds of particulate crude titanium metal having a surface area of 100 sq. ft./lb., and an analysis of $O_2$—0.56%, Fe—0.41%, $N_2$—0.03%, balance substantially titanium. We also suspend into the vessel a titanium cathode rod having an octagon cross section, 12" long and measuring ¾" across at its widest point. The whole vessel is provided with an atmosphere of argon and then filled with a molten bath consisting essentially of sodium chloride, containing 3% by weight of soluble titanium as chloride which has an average titanium valence of 2.05 and a soluble sodium metal content equivalent to 1 ml. of hydrogen per gram of salt in acidified ferric sulphate.

This method of control of the analysis of this bath is fully described in the co-pending application of Dean and Resnick, Serial No. 605,231, dated August 20, 1956, now Patent No. 2,881,055.

The electrodes are situated so that the space between the center of the cathode is 2¼" from the inside cylinder of the anode basket.

The temperature of the molten bath is maintained at 850° C., and a direct current is passed through the cell initially at 35 amperes. The closed circuit E.M.F. reads .408 volt and the open circuit voltage is .020. We periodically raise the amount of current flowing at regular intervals so that at the end of one day it has averaged 100 ampere hrs. per hour. The closed circuit E.M.F. at the end of our experiment is .666 volt and the instantaneous open circuit E.M.F. is 0.14 volt.

After the experiment is completed, we drain the electrolyte from the vessel and cool the vessel to room temperature before disassembling the anode and cathode. We find at the cathode a titanium plate 10 mils thick, a layer of salt 10 mils thick and having the same composition as that of the bath with dispersed fine titanium crystals, and an outer layer of intergrowths of alpha titanium crystals growing out like limbs on a tree. The crystals that comprise the intergrowth are all at least 1 mm. in their longest diameter and of tabular habit in planar arrangement. The intergrowths are all at least ¼" in their greatest dimension. Ninety percent by weight of the intergrowths may be easily detached by hand from the cathode while the balance can be easily removed with a spatula. The intergrowths have a density of 4.5 grams/cc. The amount of salt bath left undrained on the crystals totals 40 grams while the total weight of the crystals recovered is 1350 grams. Analysis of the crystals showed $O_2$—0.02%, Fe—0.004%, $N_2$—0.003%, balance substantially titanium. The composition of the electrolyte remained unchanged by the experiment.

In this example, we break the composition of our invention from the rod by forcing a chisel between the titanium plate and the steel rod. Since the rod has an octagon shape, we obtain eight strips each 12" long and about ¼" wide. We use these as consumable electrodes in arc melting in a vacuum furnace. The plate provides a simple means of contact and the salt layer a suitable atmosphere for low voltage operation of high vacuum of 20 microns. The ingot obtained in this way has an exceptionally low hardness of Brinell 50 as compared with an ingot obtained by separating the intergrowths from the composition and melting in a conventional consumable electrode arc furnace at an argon pressure of 200 microns which has a hardness of 100 Brinell.

*Example II*

In this example, we proceed as in the first example except that we use an electrolyte of 8% soluble titanium chloride, average valence of titanium 2.3, soluble alkalinous metal equivalent to 20 ml. of hydrogen evolved in an acidified ferric salt solution, 35% sodium chloride, and balance strontium chloride. The temperature of the electrolyte is maintained at 800° C. The plate of the composition of our invention is 5 mils thick and the salt layer, analyzed as in Example I, 10 mils thick. The crystal intergrowths forming the outer layer of our composition are made up of crystals of alpha titanium of tabular habit and arranged as open branching limbs. The composition of the electrolyte remains unchanged by the electrolytic operation.

*Example III*

In this example, we proceed as in Example I, except that we use an electrolyte of NaCl to which has been added 6% soluble titanium as chloride, average valence 2.4, and dissolved $Na^0$ 0.4%, and a cell made of Inconel with a mild steel liner which is 24" in diameter. The anode basket is made of two concentric cylinders with a common bottom which are 15" deep and 14" and 20" in diameter respectively. The cathode is a mild steel bar 2" in diameter, the outer edge of which is 6" equidistant at all points from the inner cylinder of the anode.

Into the anode basket, we place 21 lbs. of titanium scrap having a surface area of 100 sq. ft./lbs. analyzing $O_2$—1.0%, Fe—0.5%, $N_2$—0.9%, Cr—2.0%, balance substantially titanium. The electrolysis is carried out at 900° C. for 24 hours by starting the current at 110 amperes with an instantaneous open circuit E.M.F. of 0.010 volt, and ending at 630 amperes with an instantaneous open circuit E.M.F. of 0.050 volt, the average current being 300 amperes. The composition of our invention separated from the 2" diameter steel bar weighed 3920 grams of which 5% of this weight was bath held on the intergrowths. The intergrowths are arranged with respect to the titanium plates to form open branching limbs, the crystal intergrowths being pure alpha titanium pseudomorphic after beta titanium and in polar disposition with respect to the titanium plate. The analysis of the crystals is $O_2$—0.01%, Fe—0.002%, $N_2$—0.0006%, balance substantially titanium. The composition of the electrolyte remains unchanged by the electrolysis.

The titanium plate was 3 mils thick and the salt layer 5 mils thick. The crystal intergrowths made up 98% by weight of the composition. The composition was stored and transported to another place where it was soaked in very dilute acid after which it was readily disintegrated into its components. The coarse intergrowths were separated from the fine crystals in the salt layer by a screen, and after washing were melted in an inert atmosphere in high vacuum to produce an ingot having a Brinell hardness of 60.

*Example IV*

We proceed as in Example I, except that instead of using a basket anode made of concentric cylinders, we use a basket anode made of a single cylinder of perforated mild steel 2" in diameter and 12" high, containing one pound of —60 mesh crude titanium analyzing $O_2$—3%, Fe—1%, C—0.4%, $N_2$—0.05%, balance substantially titanium, which is spaced laterally 3" from the cathode rod which is a ½" diameter steel rod. We begin the electrolysis at 20 amperes and increase it in regular steps to 100 amperes over a period of 24 hours. The initial instantaneous open circuit E.M.F. is 0.015 volt. The temperature throughout is 880° C.

There is formed on the cathode rod a composition of our invention, having a titanium plate 4 mils thick, a salt layer 10 mils thick, and intergrowths of titanium analyzing $O_2$—0.01%, $N_2$—0.0006%, Fe—0.001%, arranged with respect to the plate to form open branching limbs, said crystal integrowths being partly of tabular habit in planar arrangement and partly of block-like habit and pseudomorphic form after beta titanium in polar arrangement with respect to the plate. A few filamentary crystal aggregates are found. The individual crystals all being more than 1 mm. in their longest dimension and the intergrowths being at least ¼" in their largest dimension.

The ½" steel rod with the composition of our invention attached thereto is used as a means of transport to washing tanks where the salt is washed from the intergrowths by dilute acid without disintegrating the composition. The intergrowths are then removed by hand from the steel rod with titanium plate and salt layer. The intergrowths are then dried and used in the preparation of consumable electrodes for arc melting into ingots.

*Example V*

In this example, we proceed as in Example II except that the temperature is 500° C., and to obtain the composition of our invention we use an anode material having 1000 sq. ft./lb.

The composition formed on the cathode consists of a plate 10 mils thick, a salt layer 20 mils thick, and a layer of intergrowths of alpha titanium in tabular habit. The total weight of the composition was 1300 grams.

*Example VI*

We proceed in this example as in Example I except that we use a bath consisting essentially of potassium chloride.

The product obtained is identical with the one of that example, but we do not strip it from the rod. We place the rod with the attached composition of our invention in an evacuated quartz vessel and heat the rod and composition by induction to evaporate the salt and condense it in the upper part of the vessel. The titanium from the two outer layers of our composition falls to the bottom of the vessel from which it is recovered after cooling. The plated rod may be reused as a cathode.

The titanium intergrowths and fine crystals are exceptionally pure and may be melted in high vacuum into ingots having a hardness of 50 Brinell.

*Example VII*

In this example, we use the anode material and electrolyte of Example II. We use a temperature of 900° C. The anode material is placed in several baskets concentric with the cathode. Provision is made to add anode material periodically to these baskets. The cathode arrangement is shown in Figures 2 and 3. The cathode is a hollow steel cylinder, 4" internal diameter, ⅛" thick, shown in Figure 2 at 1. Positioned below the cathode is a sump 2, into which the crystals formed on the cathode are periodically dropped by moving the scraper 3, up and down the cathode.

The screw elevator 4 inside the hollow cathode moves the crystal intergrowths from the sump out of the bath and discharges them from the cell through a lock 5. The elevator is provided with perforated blades to permit salt drainage.

The relationship of the anodes 6 to the cathode is shown in top view in Figure 3.

In carrying out this example, we pass a direct current of 100 amperes from the anode basket having anode material with a surface of 200 square feet to the cathode. The composition of our invention is formed on the cathode and every ten hours we scrape the intergrowths from the composition. The elevator is operated continuously and removes the material from the cell. At the end of 24 hours, 1500 grams of crystal intergrowths have been removed from the cell. These intergrowths are essentially cubic pseudomorphs of alpha titanium after beta titanium and are all about ½" in maximum dimension. The intergrowths retain about 6% salt and are washed with dilute acid. They analyze $O_2$—0.01%, $N_2$—0.006%, Fe—0.001%, balance substantially titanium. The electrolyte composition is not changed by the electrolytic process.

The plate of our composition increases slightly in thickness as the cathode is used. This increase, however, is only a few mils per day and as the stripping ring has considerable clearance, the cathode may be used for a considerable time before it must be removed and stripped of the plate.

The thickness of the salt layer does not substantially increase.

What is claimed is:

1. A composition of matter comprising a non-porous titanium plate, from 0.1–2.5 mils thick, attached to a layer of solidified salt bath with dispersed fine titanium crystals, said layer being from 1–50 mils thick, and attached on its other surface to a layer of pure alpha titanium crystal intergrowths, said intergrowths constituting at least 90% by weight of the composition arranged with respect to the titanium plate to form open branching limbs, said intergrowths all being at least ¼ inch in their longest dimension the improvement which consists of the intergrowths being of parallel variety composed of crystals of cubic form pseupdomorphic after beta titanium.

2. In a process for producing the composition of claim 1, by the steps of providing a mass of comminuted crude titanium having at least 100 square feet of surface per pound in contact with an inert anode basket, in a bath consisting essentially of at least one molten alkalinous chloride in association with 3–8% soluble titanium as chloride, with an average titanium valence of more than 2.0 and less than 2.05 at 3% soluble titanium and 2.6 at 8% soluble titanium and dissolved alkalinous metal equivalent to 1–20 cc. evolved $H_2$ per gram of salt in acidified ferric salt solution, and an inert metal cathode surface, the improvement which consists in maintaining the temperature at 900–950° C. while passing a direct current between anode and cathode, said current being gradually increased to a maximum of 30–100 amperes per pound of comminuted crude titanium in the anode material and selecting the cathode surface so that the initial current density thereon will be 150–1000 amperes per square foot, the instantaneous open circuit voltage of the cell being less than 100 mv. at all times, whereby to produce crystals of cubic form without changing the bath composition by the electrolytic step, draining the salt bath from said cathode surface and adhering titanium without exposure to air.

References Cited in the file of this patent
UNITED STATES PATENTS

| | | |
|---|---|---|
| 2,722,509 | Wainer | Nov. 1, 1955 |
| 2,734,856 | Schultz et al. | Feb. 14, 1956 |
| 2,748,073 | Mellgren | May 29, 1956 |
| 2,760,930 | Alpert et al. | Aug. 28, 1956 |
| 2,783,196 | Raney | Feb. 26, 1957 |
| 2,817,631 | Gullett | Dec. 24, 1957 |

OTHER REFERENCES

Journal of the Electrochemical Society, vol. 99, No. 8, August 1952, pp. 223C–224C.